June 25, 1946.　　　　J. FLATT　　　　2,402,618
GROSS WEIGHT INDICATOR FOR AIRPLANES
Filed April 16, 1945
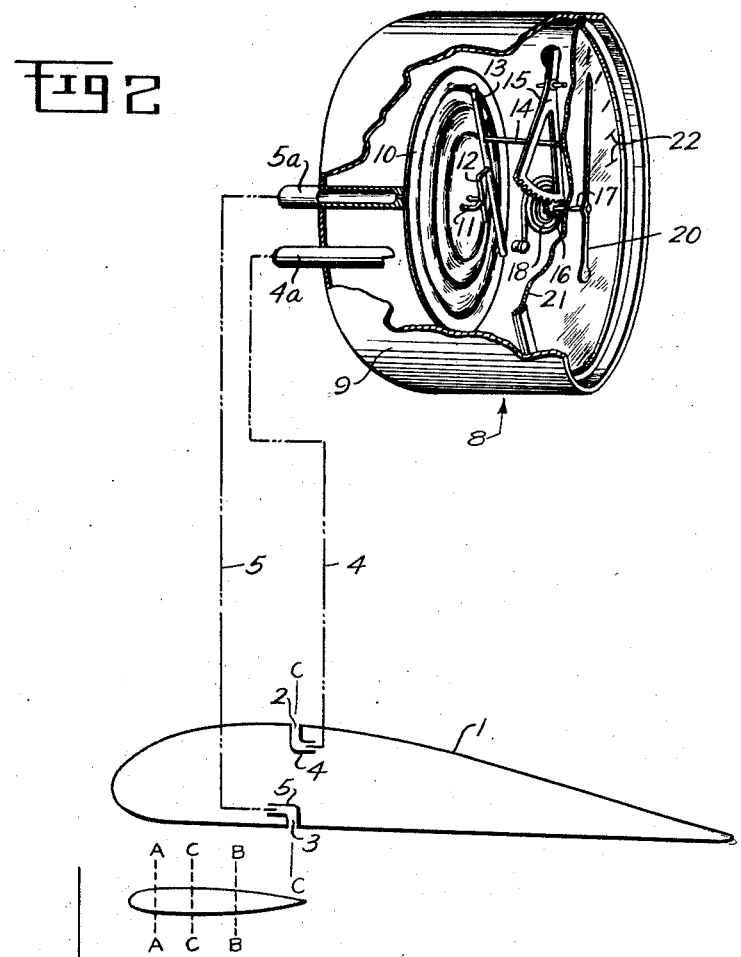
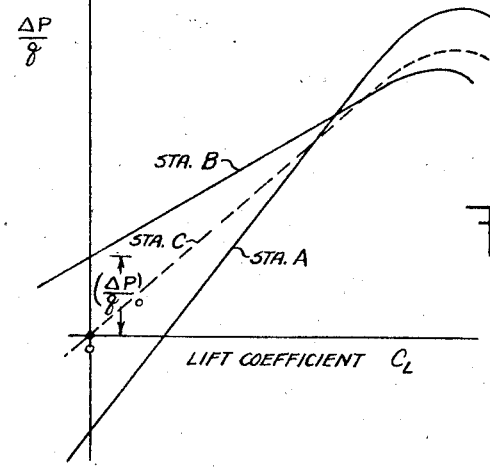
INVENTOR.
JOSEPH FLATT
BY
ATTORNEYS Patented June 25, 1946

2,402,618

UNITED STATES PATENT OFFICE 2,402,618

GROSS WEIGHT INDICATOR FOR AIRPLANES

Joseph Flatt, Washington, D. C.

Application April 16, 1945, Serial No. 588,503

2 Claims. (Cl. 73—178)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument for measuring the gross weight of an airplane while in flight and utilizes the pressure difference between the upper and lower surface of the airplane wing at a particular point as a measure of the gross weight.

I am aware that it has been proposed to utilize the difference in pressure between the upper and lower surface of an aircraft wing to actuate a stall-warning device and as a source of pressure difference for actuating an airspeed indicator but not as a means for indicating gross weight. From the results of a series of pressure distribution tests made in flight I have discovered that in the portions of the wing not subject to fluctuations in flow due to the propeller wash and vortex flow at the wing tips that at any desired chordal station a point can be found where the pressure difference between the upper and lower surfaces of the wing will be independent of airspeed so long as the aircraft remains in level flight and the pressure difference varies as a function of the gross weight.

It is therefore an object of the invention to provide an indicating mechanism to continuously indicate during level flight the gross weight of an airplane.

It is a further object of the invention to provide a pressure-measuring, indicating mechanism operatively associated with the wing of an airplane so as to continuously measure the variation during level flights of the average wing loading in terms of gross weight of the airplane.

It is another object of the invention to provide means for continuously measuring the variation in average wing loading on an airplane wing during level flight in terms of gross weight of the airplane and comprising two ports, one positioned on the upper surface of the wing and the second positioned in the same vertical plane as the first port and located on the under surface of the wing, the ports being positioned aft of the leading edge at a point where the difference in pressure therebetween remains independent of change in airspeed and differential pressure responsive means calibrated in terms of gross weight of the airplane connected to the ports to measure the differential pressure therebetween.

Other objects and features of the invention will become apparent by reference to the detailed description hereinafter given and to the appended drawing in which:

Fig. 1 is a diagram in the form of curves illustrating underlying principles of the invention; and Fig. 2 is a diagrammatic illustration of the component parts of a gross weight indicator in accordance with the invention.

It is well understood in the art that airflow over the wing of an airplane produces a subatmospheric pressure over the upper surface of the wing and a superatmospheric pressure on the undersurface of the wing and this pressure and its distribution at corresponding station points measured aft of the leading edge parallel with the chord can readily be determined by means of a manometer connected by tubing to ports on the upper and lower surfaces of the wing on a wind tunnel model or a machine in flight.

If the pressure difference between ports on the upper and lower surfaces at corresponding stations aft of the leading edge represented by $\Delta P$ is measured and divided by the dynamic pressure of the test = $q = \frac{1}{2} PV^2$ and these values plotted against lift coefficient $C_L$ curves will result similar to those indicated for Sta. A, and Sta. B, Fig. 1.

For Fig. 1, curve Sta. B, the equation within the straightline portion may be expressed as:

(1) $$\frac{\Delta P}{q} = \left(\frac{\Delta P}{q}\right)_0 + \frac{d\left(\frac{\Delta P}{q}\right)}{dC_L} C_L$$

and multiplying through by $(q)$ $$\Delta P = \left(\frac{\Delta P}{q}\right)_0 q + \frac{d\left(\frac{\Delta P}{q}\right)}{dC_L} C_L q$$

For level flight the lift L, may be assumed to be equal to the weight of the airplane W or $$L = W = C_L q S \text{ where } S = \text{wing area.}$$

or $$C_L q = \frac{W}{S}$$

and now, (2) $$\Delta P = \left(\frac{\Delta P}{q}\right)_0 q + \frac{d\left(\frac{\Delta P}{q}\right)}{dC_L} \frac{W}{S}$$

Since the term $$\frac{d\left(\frac{\Delta P}{q}\right)}{dC_L}$$

is a nondimensional constant Eq. 2 may be rewritten as:

(3) $$\Delta P = \left(\frac{\Delta P}{q}\right)_0 q + K$$

where $$K = d\frac{\left(\frac{\Delta P}{q}\right)}{dC_L} \frac{W}{S}$$

and hence K will vary with the average wing loading $$\left(\frac{W}{S}\right)$$

and as the gross weight W

If in Eq. 3 the term $$\left(\frac{\Delta P}{q}\right)_0 \bar{q}$$

was zero, then $\Delta P$ would vary directly with W. By inspection of the curves for Sta. A and Sta. B, Fig. 1, it is seen that $(\Delta P/q)_0$ in each of these cases is not zero and hence the pressure difference at these station points would vary with airspeed. It is obvious however from inspection of Fig. 1 that at some station between Sta. A and Sta. B a point can be found where a curve of $\Delta P/q$ will pass through the origin and the value of $$\left(\frac{\Delta P}{q}\right)_0$$

will equal zero so that for this station $\Delta P$ will vary directly with (W) or gross weight and be independent of airspeed. If then a differential pressure indicator of a character similar to an airspeed indicator is connected to the ports on the upper and lower surface and the scale calibrated in terms of gross weight, the indicator will continuously indicate the gross weight of the airplane during level flight. The indication of gross weight during flight is of great value on heavy aircraft employed for long range operation since the pilot can change the airspeed for maximum range if he knows the variation in gross weight as the flight proceeds.

The manner in which the purposes of the invention are carried out is illustrated in Fig. 2, in which the reference numeral 1 represents the transverse or chordwise cross section of an airplane wing at any desired spanwise station not within a region of turbulent flow. The upper and lower surfaces of the wing in the plane of section 1 are provided with ports 2 and 3 which are aligned in the same vertical plane C—C at the position aft of the leading edge determined for these ports similar to that as discussed with respect to Fig. 1.

The ports 2 and 3 are respectively connected by means of conduits 4 and 5 to connections 4a and 5a of a differential pressure-measuring device similar to a conventional airspeed indicator and generally indicated by the reference numeral 8. The pressure-measuring device 8 includes a sealed casing 9 into the interior of which connection 4a communicates. The connection 5a communicates with the interior of a metal capsule or bellows 10, the wall or walls of which deflect in accordance with the difference between the pressures in the case and the interior of the capsule. The capsule 10 has a member 11 which engages an arm 12 mounted on a rockshaft 13 which is provided with a second arm 14 which engages a pivotally-mounted gear sector 15. The gear sector 15 meshes with a pinion gear 16 mounted on a pointer shaft 17 which is biased in one direction by a coiled hairspring 18. A pointer 20 is mounted on the outer end of the pointer shaft 17 and cooperates with a dial 21 having indicia 22 thereon calibrated in terms of gross weight of the airplane upon which the device is to be installed.

The operation of the device of Fig. 2 is as follows: By means of a pressure distribution test on a particular type airplane either in flight or by testing a model in the wind tunnel, the position of the ports 2 and 3 can be readily determined such that the differential pressure reading therebetween remains independent of airspeed. When ports 2 and 3 are connected by means of conduits 4 and 5 respectively to the differential pressure indicator or gage 8 and the aircraft flown in level flight with a known gross weight the capsule 10 will deflect in proportion to the difference in the static pressure at ports 2 and 3 and pointer 20 will move to a position relative to the indicia on the dial which can then be calibrated for the known gross weight. By repeating flights at different gross weights the dial may be calibrated for the full range of gross weights for the particular airplane in question. Once the location of the ports 2 and 3 has been determined for a particular type of airplane at a particular wing chord station and an instrument dial calibrated for that particular type airplane, the indicator will continuously indicate the gross weight of the airplane during level flight. Similar assemblies may then be constructed and installed on other aircraft of the same type without requiring calibration.

Having described my invention, what I wish to secure by Letters Patent is:

1. An indicating device for continuously indicating the gross weight of an airplane during level flight, comprising in combination with the airplane wing, a pair of aligned ports positioned in the same transverse plane on the wing, one of the ports extending through the upper surface and the other port extending through the lower surface of the wing, said ports being positioned at spaced points in said transverse plane where the difference between the static pressures on the upper and lower surfaces is independent of change in airspeed, and a differential pressure-responsive, indicating means connected to said ports, said indicating means including a pointer and cooperating scale having indicia thereon calibrated in terms of gross weight of the airplane.

2. A pressure-responsive means for indicating the gross weight of an airplane during flight comprising in combination with the airplane wing a first port on the upper surface of the airplane wing and a second port on the lower surface of the wing, said ports being in substantial alignment and positioned aft of the leading edge such that the difference in static pressures between said ports remains independent of airspeed during level flight and pressure-responsive, indicating means connected to said ports and operative in accordance with a function of the difference in static pressures between said ports to indicate said pressure difference in terms of gross weight of the airplane.

JOSEPH FLATT.